United States Patent [19]
Füchter et al.

[11] Patent Number: 5,796,364
[45] Date of Patent: Aug. 18, 1998

[54] METHOD OF DETERMINING THE VELOCITY OF A RADAR TARGET

[75] Inventors: Norbert Füchter, Erbach; Franz-Xaver Hofele, Donzdorf, both of Germany

[73] Assignee: Daimler-Benz Aerospace AG, Munich, Germany

[21] Appl. No.: 802,428

[22] Filed: Feb. 18, 1997

[30] Foreign Application Priority Data

Feb. 15, 1996 [DE] Germany ............... 196 05 568.7

[51] Int. Cl.$^6$ ............... G01S 7/295; G01S 13/53
[52] U.S. Cl. ............... 342/99; 342/101; 342/115; 342/137
[58] Field of Search ............... 342/99, 101, 115, 342/116, 135, 137, 194, 195

[56] References Cited

U.S. PATENT DOCUMENTS

| | | | |
|---|---|---|---|
| 3,631,489 | 12/1971 | Cooper | 342/161 |
| 3,765,017 | 10/1973 | Dentino | 342/162 |
| 3,914,763 | 10/1975 | Green et al. | 342/161 |
| 3,935,572 | 1/1976 | Broniwitz et al. | 342/80 |
| 4,057,800 | 11/1977 | Ganz | 342/116 |
| 4,377,811 | 3/1983 | Mooney, Jr. et al. | 342/94 |
| 4,642,641 | 2/1987 | Campbell | 342/88 |
| 4,746,922 | 5/1988 | Prenat | 342/88 |
| 4,847,622 | 7/1989 | Maitre et al. | 342/110 |
| 4,924,231 | 5/1990 | Prenat | 342/137 |
| 5,559,516 | 9/1996 | Didomizio et al. | 342/118 |

FOREIGN PATENT DOCUMENTS

| | | |
|---|---|---|
| 0 336 273 A2 | 10/1989 | European Pat. Off. |
| 0 444 458 A2 | 9/1991 | European Pat. Off. |

*Primary Examiner*—John B. Sotomayor
*Attorney, Agent, or Firm*—Spencer and Frank

[57] ABSTRACT

A method of determining the velocity of a radar target wherein at least two different pulse repetition frequencies are used. Each pulse repetition frequency comprises a predetermined division into equidistant Doppler numbers. For an echo signal, a Doppler number associated with the echo signal is determined for each pulse repetition frequency. Out of two Doppler numbers associated with different pulse repetition frequencies, a nonambiguous Doppler number is subsequently determined which lies within a predetermined velocity nonambiguity range, and the velocity of the radar target is determined from this Doppler number.

9 Claims, 1 Drawing Sheet

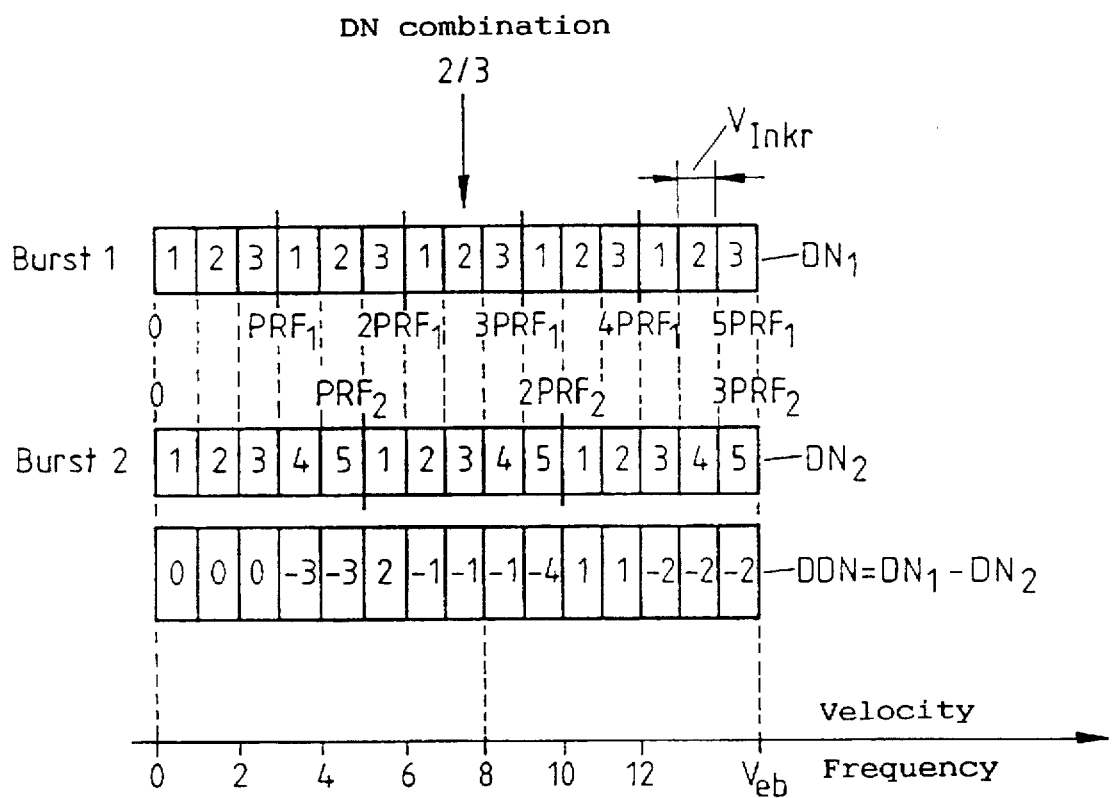

METHOD OF DETERMINING THE VELOCITY OF A RADAR TARGET

CROSS REFERENCE TO RELATED APPLICATIONS

This application claims the priority of German patent application No. DE 196 05 568.7, filed Feb. 15, 1996, which is incorporated herein by reference.

BACKGROUND OF THE INVENTION

The invention relates to a method of determining the velocity of a radar target by use of a pulse-Doppler radar, wherein a transmit signal comprising at least two pulse trains (bursts) having different pulse repetition frequencies is emitted; the echo signals, which are associated with each pulse train and are reflected at a radar target, are evaluated using a Doppler filter bank comprising a predetermined number of Doppler filters, with a predetermined velocity range corresponding to each Doppler filter and a nonambiguous velocity of the target is determined from the combination of the signals of the Doppler filters associated with each pulse repetition frequency.

In a pulse-Doppler radar, a train of transmit pulses with a predeterminable constant pulse repetition frequency (PRF) is emitted. If the transmit pulses are reflected at a radar target moving radially relative to the location of the pulse-Doppler radar, a pulse train of echo pulses is generated having a pulse repetition frequency which is frequency-shifted with respect to the transmit PRF according to the radial velocity.

With a pulse-Doppler radar, the distance of a radar target from the transmitting/receiving antenna can also be determined.

Such a pulse-Doppler radar has a respective non ambiguous range for the distance as well as for the doppler frequency $f_D$. These non ambiguous ranges are related to the pulse repetition frequency PRF according to the formulas $$R_{max} = c/(2 \cdot PRF) \text{ and}$$

$$0 \leq f_D \leq PRF,$$

where $R_{max}$ represents the maximum nonambiguous range, c is the velocity of light, and $f_D$ is the doppler frequency that can be determined non-ambiguously.

Based on this situation, either a large distance-nonambiguity range can be selected with a low PRF (LPRF), for example, 1 kHz, or a large doppler-nonambiguity range can be selected with a high PRF (HPRF), for example, 100 kHz.

If a large nonambiguous distance range as well as a large nonambiguous doppler range are required for a monitoring task, it is obvious to select a radar installation with a switchable PRF. With such a radar installation, either the distance or the doppler frequency of a radar target can be determined nonambiguously during a pulse train (burst). Furthermore, several PRF's can be selected (staggered) such that both the distance and the doppler frequency can be determined nonambiguously from the individual measurements for distance (range) as well as velocity (Doppler) by way of a suitable combination of the measurements which, when taken by themselves, might be ambiguous.

It is the object of the invention to provide a method with which a predetermined large nonambiguous dopler range is also possible for a predetermined low pulse repetition frequency. As velocity is fixed related to the doppler frequency by the formula $f_D = 2 \cdot_c^v f_{tr}$ with $f_{tr}$ being the transmitted RF (radio frequency), v being the radial velocity and c being the velocity of light, in the following the extraction of target velocity is considered (instead of doppler frequency).

SUMMARY OF THE INVENTION

The above object is achieved according to the invention by a method of determining the nonambiguous velocity of a radar target by use of a pulse-Doppler radar, including emitting a transmit signal comprising at least two pulse trains having different pulse repetition frequencies, evaluating the echo signals, which are associated with each pulse train and are reflected at a radar target, using a Doppler filter bank comprising a predetermined number of Doppler filters, with a predetermined velocity range corresponding to each Doppler filter, and determining a nonambiguous velocity of the target from the combination of the signals of the Doppler filters associated with each pulse repetition frequency; with the method further comprising:

as a function of a predetermined velocity nonambiguity range ($V_{eb}$) and of a predetermined velocity increment ($V_{Inkr}$), subdividing the velocity nonambiguity range ($V_{eb}$) into an integral number of nonambiguous Doppler numbers ($DN_{n/m}$; n,m=1,2,...) whose width corresponds to that of the velocity increment ($V_{Inkr}$);

emitting the two pulse trains (bursts) having different pulse repetition frequencies ($PRF_1$, $PRF_2$, ...) which are used so as to be alternating in time, with the respective pulse repetition frequencies being selected to be at a fixed, predetermined, integral ratio (SV) relative to one another, and with each pulse repetition frequency ($PRF_1$, $PRF_2$,...) comprising an integral multiple ($N_1$, $N_2$,...) of the velocity increment ($V_{Inkr}$), with the velocity increments being numbered consecutively, within each pulse repetition frequency ($PRF_1$, $PRF_2$,...) and being identified as Doppler numbers ($DN_1$, $DN_2$,...), and with the velocity nonambiguity range ($V_{eb}$) including integral multiples of the respective pulse repetition frequencies ($PRF_1$, $PRF_2$, ...);

for each echo signal and each pulse repetition frequency ($PRF_1$, $PRF_2$, ...) in the Doppler filter bank, determining at least one first filter number (FI_1) of that Doppler filter which comprises the maximum (largest) amplitude value ($A_K$);

determining a Doppler number ($DN_1$, $DN_2$, ...) which is associated with the determined number (FI_1) of the respective Doppler filter and the respective pulse repetition frequency using at least two tables, with each table being associated with a respective pulse repetition frequency;

for each combination of the determined Doppler numbers ($DN_1$, $DN_2$, ...), determining an associated nonambiguous Doppler number ($DN_{n/m}$; n,m=1,2,...) within the velocity nonambiguity range ($V_{eb}$); and, multiplying the nonambiguous Doppler number ($DN_{n/m}$; n,m=1,2,...) and the velocity increment ($V_{Inkr}$) to determine the nonambiguous velocity of the radar target.

Advantageous embodiments and/or modifications of the invention are likewise described and disclosed.

A first advantage of the invention is that it allows a quick determination of the velocity of a radar target since merely a single table is necessary for estimating the nonambiguity range.

A second advantage is that a very reliable determination of a nonambiguous velocity becomes possible because measuring errors can be corrected which specifically stem from a poor signal-to-noise voltage ratio.

A third advantage is that a very precise and reliable velocity estimate is used. Therewith faulty measurements are recognized and corrected by an algorithm for the correction of Doppler numbers.

A fourth advantage is that by use of the correction of the Doppler numbers, the velocity of a target in the selected PRF range is measured reliably for the bursts that are used. A subsequent convolution of this measured velocity or of the associated Doppler numbers by use of the so called Chinese algorithm (Chinese remainder theorem) leads to an equally precise result in the predetermined nonambiguous velocity range.

A fifth advantage is that the correction of the Doppler numbers and their convolution by use of the Chinese algorithm generally creates only negligible masking ranges in which unreliable velocity estimates might occur.

Further advantages can be derived from the description that follows.

The invention is explained below in greater detail by way of embodiments with reference to schematically illustrated drawings.

BRIEF DESCRIPTION OF THE DRAWINGS

The FIGURE is a schematically illustrated diagram to explain the method according to the invention.

DETAILED DESCRIPTION OF THE PREFERRED EMBODIMENT

In the invention, transmit pulse trains (bursts) having a different pulse repetition frequency (PRF) are emitted successively in time by a transmitting antenna in a manner that is known per se. The pulse repetition frequency (PFR) of the respective bursts are at a predeterminable ratio with respect to one another, which will be explained below. At least two different PRFs are used alternatingly in time. For particularly reliable measurements of the velocity of a radar target, it is advantageous to always use at least three different PRF's alternating in time. The echo signals generated by all transmitted pulse trains (echo pulse trains) are preferably mixed down into the video range (baseband) in a receiving path which is common to all PRFs, and the echo signals are supplied in analog or preferably digital form to a single Doppler filter bank known per se which operates in the analog or digital mode. The Doppler filter bank comprises a predetermined number of Doppler filters, for example, eight, each comprising a predetermined, relative frequency range from 0 Hz up to the respective pulse repetition frequency PRF. This Doppler frequency range (velocity range) is always subdivided into a number DF of Doppler frequency intervals (velocity intervals or velocity bins), dependent on the PRF value. Then the velocity can be determined in the known manner with a precision of approximately PRF/DF. It is known that the velocity determined in this manner for a specific PRF is only nonambiguous for a high PRF.

A determination of the unambiguous of the velocity is possible with the method described below; the various steps of the method are first described as a whole and then individually.

1. According to the FIGURE, a nonambiguous velocity range, $V_{eb}$, is predetermined. This means that a nonambiguous velocity measurement is intended to be possible in the velocity range 0 to $V_{eb}$. The nonambiguous velocity range $V_{eb}$ (nonambiguous (Doppler) frequency range) is subdivided into a predetermined number of velocity increments $V_{Inkr}$ (frequency increments), i.e., 15 in the FIGURE.

2. Alternating in time, at least two bursts (burst 1, burst 2) having different pulse repetition frequencies $PRF_1$, $PRF_2$ then are emitted. It is particularly advantageous to emit at least three bursts (burst 1, burst 2, burst 3) alternating in time with the associated pulse repetition frequencies $PRF_1$, $PRF_2$, $PRF_3$, which will be explained below in detail. With three bursts a very good error correction is possible.

3. For each burst i with i=1, 2, 3, the associated pulse repetition frequency $PRF_i$ (i=1, 2, 3) is selected such that it corresponds to a predetermined integral multiple $N_i$ (i=1, 2, 3) of the velocity increment $V_{Inkr}$, also identified as a staggering or grading number, according to the formulas $$VB_i = N_i \cdot V_{Inkr} \text{ and } PRF_i \sim VB_i,$$

wherein ~designates the proportional sign and $VB_i$ the blind speeds associated with the $PRF_i$'s, which blind speeds are determined, for example, by calculation and/or empirically. The ratio between two staggering numbers, for example, $N_1/N_2$, is also identified as a staggering or grading ratio SV, here, for example, $SV = N_1/N_2$.

4. The velocity increments $V_{Inkr}$ comprised in each $PRF_i$ are numbered consecutively and then identified as Doppler numbers $DN_i$. According to the FIGURE, the following then applies for Burst 1: $1 \leq DN_1 \leq 3$
Burst 2: $1 \leq DN_2 \leq 5$.

5. The nonambiguous velocity range $V_{eb}$ associated with two respective bursts is selected according to the FIGURE such that the following formula applies:

$$V_{eb} = N_2 \cdot VB_1 = N_1 \cdot VB_2 \text{ and } PRF_i \sim VB_i.$$

It is clear from the FIGURE that if the pulse repetition frequencies $PRF_1$, $PRF_2$ within the nonambiguous velocity range $V_{eb}$ are selected in this manner, each combination of the Doppler numbers $DN_1$, $DN_2$ occurs only once. It follows that for each pulse repetition frequency $PRF_1$, $PRF_2$ an associated Doppler number $DN_1$, $DN_2$ must first be generated. From the resulting combination, wherein the sequence of the DN numbers must be considered, the required velocity (in units of the velocity increment $V_{Inkr}$) within the nonambiguous velocity range $V_{eb}$ can then be determined nonambiguously. It is clear from the FIGURE that, for example, the DN number combination 2, 3 marked by an arrow occurs only at one single position.

The above-mentioned parameters are determined, for example, according to the following process:

According to the formula for the nonambiguous distance range mentioned at the outset, the associated PRF for a distance range to be monitored is selected first, for example, 2 kHz for a ground-based radar. From this and from the transmitting frequency that is used, for example, 2 GHz, an associated maximum blind speed $VB_{max}$ can be determined, for example, on the basis of an experimental measurement and/or on the basis of an associated empirical formula.

The desired nonambiguous velocity range is assumed to be fixed by the formulas $$-V_{max} \ldots 0 \ldots +V_{max} \text{ or}$$

$$0 \ldots 2 \cdot V_{max}.$$

wherein $V_{max}$ represents the velocity to be measured at a maximum.

From this it follows that for the nonambiguous velocity range $$V_{eb} = 2 \cdot V_{max}.$$

From the formulas $$VB_1 = (2 \cdot V_{max})/N_2 \text{ and}$$

$$VB_2 = (2 \cdot V_{max})/N_1,$$

the blind speeds $VB_1$, $VB_2$ associated with the pulse repetition frequencies $PRF_1$, $PRF_2$ can then be determined, wherein, for example, $VB_2 = VB_{max}$ can be set. Therewith $N_1$ can be determined from the last formula. $N_2$ can then be determined from the so-called staggering ratio SV with $SV = N_1:N_2$. The following formulas also apply for the velocity increment $V_{Inkr}$ $$V_{Inkr} = VB_1/N_1,$$

$$V_{Inkr} = VB_2/N_2 \text{ and}$$

$$2 \cdot V_{max} = N_1 \cdot VB_2 = N_2 \cdot VB_1 = N_1 \cdot N_2 \cdot V_{Inkr}.$$

If the velocity increment $V_{Inkr}$ is now predetermined, which corresponds to a required velocity resolution, for example, $V_{Inkr} = \pm 5$ m/s, the quantities SV, $PRF_1$, $PRF_2$, $N_1$, $N_2$ can be determined from the above-mentioned formulas. Thus, the properties (operating parameters) of the radar installation are set.

To determine the velocity of a radar target, bursts with different pulse repetition frequencies $PRF_1$, $PRF_2$ are now emitted alternating in time and the echo signals associated with each pulse repetition frequency are supplied to a Doppler filter bank comprising, for example, eight Doppler filters. Each of the Doppler filters generates an amplitude value $A_k$, wherein k identifies the (filter) number of the Doppler filter, for example, k=0.1 . . . 7. For each pulse repetition frequency $PRF_1$, $PRF_2$, that (filter) number is now determined with which a maximum amplitude value is associated. For this (filter) number, in which the maximum amplitude value occurs, the Doppler number DN associated with the pulse repetition frequency is determined by use of a table which may, for example, be based on empirical values as well as on the type of the Doppler filters used. Here, a separate table is allocated to each pulse repetition frequency PRF. Thus, the Doppler numbers $DN_1$ (for $PRF_1$) and $DN_2$ (for $PRF_2$) then follow from these two tables. By way of a table corresponding to the FIGURE, the precise position of this nonambiguous combination within the velocity nonambiguity range $V_{eb}$, which is subdivided into units of the velocity increment $V_{Inkr}$ can now be determined from this combination $DN_1$, $DN_2$.

According to the FIGURE, the combination $DN_1=2$, $DN_2=3$ marked by an arrow is located at the nonambiguous position (point) $DN_{1/2}=8$. Therefore, the required nonambiguous velocity $V_{1/2}$ results from the formula $$V_{1/2} = DN_{1/2} \cdot V_{Inkr}.$$

Solely for reasons of clarity, only the maximum amplitude value and the (filter) number associated with it were used in the process described above. A type of interpolation between the (filter) numbers is now particularly advantageous. With this, a very precise velocity determination is ultimately possible. This interpolation is based on the fact that generally the pass ranges of adjacent Doppler filters overlap in a predeterminable manner. For the interpolation, that filter number is then determined for each pulse repetition frequency, as described, in which the maximum of the amplitude values $A_k$ occurs. Then, this filter number (FI__1) as well as the associated maximum amplitude value are stored. Afterwards, that filter is selected from the adjacent filters in which the second largest amplitude value occurs and, again, the associated filter number (FI__2) as well as the associated amplitude value are stored. The table that was mentioned for the determination of the Doppler numbers DN is now designed as a function of the two filter numbers FI__1, FI__2 as well as of the quotient of the associated amplitude values. It is evident that therewith a very precise and reliable determination of the Doppler numbers becomes possible in an advantageous manner.

This method of determining the Doppler numbers may be faulty, for example, because of quantization effects in the determination of the amplitude values and/or due to noise which is superimposed on the target echoes to be evaluated. Faulty Doppler numbers may lead to a considerable incorrect estimate of the velocity in the velocity nonambiguity range, which is explained by way of the FIGURE. There it is assumed that, at burst 1 ($PRF_1$), the associated correct Doppler number $DN_1=2$ was determined for a radar target. For burst 2 ($PRF_2$), which follows in time, the associated correct Doppler number $DN_2=3$ was determined for the same radar target. Thus, the correct combination 2, 3 (arrow) is generated with which the correct velocity $V_{1/2} = 8 \cdot V_{Inkr}$ is associated. If it is now assumed that, at burst 1 ($PRF_1$), the Doppler number $DN_1$ may fluctuate by the error value $dDN_1 = \pm 1$, this additionally leads to the incorrect combinations 1, 3 and 3, 3 with which the incorrect velocities $V_{1/2} = 13 \cdot V_{Inkr}$ and $V_{1/2} = 3 \cdot V_{Inkr}$, respectively, are associated.

Such incorrect estimates can now be recognized and corrected in a surprising manner by way of the Doppler number correction, described below, which is of particular importance for both a precise and a reliable velocity estimate. This correction is possible because a Doppler number difference DDN is determined with $DDN = DN_1 - DN_2$. Forming this difference is effective, in particular, when high Doppler numbers are used and when only slightly differing pulse repetition frequencies are used. If, for example, $N_1=11$ and $N_2=12$ are selected, this means that compared to the FIGURE, the PRF intervals are subdivided much more finely, with the result that a greater velocity resolution within the velocity nonambiguity range is possible. It is obvious that, particularly for such a selection of the pulse repetition frequencies (staggering ratio $SV=N_1:N_2$), only specific, discrete, permissible Doppler number differences DDN can occur. As can be seen, these permissible differences are a function of $N_1$, $N_2$ and can be determined according to the FIGURE, for example, by way of a table.

If the Doppler number differences DDN are now determined for each measurement, it can be decided by use of a comparison whether these differences are valid differences for the prevailing staggering ratio SV. In this case, the velocity measurement is considered to be correct and it is evaluated in the manner described, that is, $V_{1/2}$ is formed.

If, however, the Doppler number difference is not a valid difference for the prevailing staggering ratio SV, the measurement is either incorrect and must be repeated or a correction can even be carried out in a surprising manner. This correction is based on the recognition that, for a predetermined staggering ratio SV, the associated Doppler number differences can merely assume permissible, discrete values for the Doppler number differences. The correction is based on the assumption that for a PRF, for example, $PRF_2$, a reliable determination of the associated Doppler number, here $DN_2$, is always possible because of the technical properties of the radar installation. Therefore, only $DN_1$ can be faulty in this case. With the further assumption that $DN_1$ can only have a predeterminable error $dDN_1$, for example, of $dDN_1 = \pm 1$, correction rules can be derived in an obvious manner which are determined, for example, empirically and are a function of $N_1$, $N_2$. On the basis of these correction rules and the knowledge of the permissible differences, a correction of a faulty Doppler number, here $DN_1$, is then possible. For example, for a staggering ratio $SV=N_1:N_2$ with $N_2-N_1>0$ and $N_2-N_1$ odd, it applies that, for the correction of at least one Doppler number $DN_1$, $DN_2$, exactly $\pm(N_2-N_1-1)/2$ Doppler numbers can be corrected.

For a reliable combination $DN_1$, $DN_2$ of Doppler numbers determined in this manner, merely their position (in units of the velocity increment $V_{Inkr}$) within the velocity nonambiguity range $V_{eb}$ must then be determined. This preferably takes place in that the determined Doppler numbers $DN_1$, $DN_2$, for example, $DN_1=2$, $DN_2=3$ according to the FIGURE, are convoluted in associated $N_i$ multiples (burst i) until both Doppler numbers have the same position (point) $DN_{1/2}$ (here $DN_{1/2}=8$) in the velocity nonambiguity range $V_{eb}$. It can be seen from the example according to the FIGURE that in burst 1 ($PRF_1$, $DN_1=2$) a convolution (each time by $N_1=3$) is necessary twice, whereas for burst 2 ($PRF_2$, $DN_2=3$) only a single convolution (by $N_2=5$) suffices. It is shown and it is important that, for such a convolution, the staggering ratio SV is selected such that the associated staggering numbers $N_1$, $N_2$ in pairs are relatively prime, because only then is the convolution nonambiguous. Such a determination of the nonambiguous Doppler number $DN_{1/2}$ within the velocity range $V_{eb}$ is possible in an advantageous manner by using the so-called "Chinese remainder set" known per se, which is also identified as "the Chinese remainder theorem" or "Chinese algorithm". This "Chinese algorithm" is known in the mathematical field of number theory, for example, from the literature reference by Otto K örner, "Algebra", page 13, Akademische Verlagsgesellschaft [Academic Publishing Company], Frankfurt on the Main , 1974. With this Chinese remainder set, the nonambiguous Doppler number $DN_{1/2}$ is determined according to the formula $$DN_{1/2}=(C_1 \cdot DN_1+C_2 \cdot DN_2) \bmod (C_3)$$

with $$C_1=B_1 \cdot N_2$$

$$C_2=B_2 \cdot N_1$$

$$C_3=N_1 \cdot N_2,$$

wherein $B_1$, $B_2$, identify fixed constants which depend on $N_1$, $N_2$ and "mod" identifies the modulo operator which is common in mathematics. From this it follows that $C_1$, $C_2$, $C_3$ are also constants which must be determined only once for predetermined $N_1$, $N_2$, for example, empirically.

In the described examples it was assumed that at least one Doppler number, here $DN_2$, can always be determined reliably. If this is not always the case, for example, in a radar installation having a high sensitivity (low signal-to-noise voltage ratio), it is advantageous, if a suitable staggering ratio was selected, to correct the Doppler numbers $DN_1$ and $DN_2$ and to emit bursts alternating in time with at least three different pulse repetition frequencies ($PRF_1$, $PRF_2$, $PRF_3$) which are at a fixed predetermined (staggering) ratio with respect to one another. In such a case, two respective bursts are always evaluated in the described manner for a radar target and the associated nonambiguous velocity is defined. This means that three nonambiguous velocities are obtained for three different pulse repetition frequencies. In this process, the probability is very high that at least two nonambiguous velocities are always of identical size within a predetermined tolerance range. This resulting nonambiguous velocity is assumed to be correct.

Thus, the method described allows an extremely precise and reliable estimate of the velocity of a target in an advantageous manner because faulty measurements are recognized and are corrected by use of the described algorithm of the correction of the Doppler numbers. Here, the accuracy of the estimate is equal to $\pm(VB_i/(2N_i))$, wherein $VB_i$ is the blind speed, $N_i$ the staggering number and i the burst number which is associated with the $PRF_i$.

By the correction of the Doppler numbers, the velocity of a target in the PRF range is measured reliably for the bursts that are used so that the convolution of this velocity (Doppler number combination), which subsequently takes place using the Chinese algorithm, produces a result that is just as precise and reliable in the nonambiguous velocity range $V_{eb}$. Compared to the formula mentioned at the outset, the nonambiguous velocity range is extremely high and is identified by the formula $$V_{eb(a/b)} = \pm \frac{N_b \cdot VB_a}{2 \cdot (N_b - N_a)}$$

wherein $V_{eb(a/b)}$ identifies the velocity nonambiguity range associated with the staggering ratio $N_a/N_b$, and $VB_i$ (i=a, b) the associated blind speeds.

Because of the described algorithms of the correction of the Doppler numbers and the Chinese algorithm, large masking ranges for doubtful (unreliable) velocity measurements are not necessary in an advantageous manner, but the velocities are estimated in an algorithmically reliable and precise manner.

For example, at a mean pulse repetition frequency of approximately 4 kHz, a nonambiguous velocity range of larger than $\pm 900$ m/s can be reached by use of such a method while, at the same time, the quality of the estimate is high.

The invention now being fully described, it will be apparent to one of ordinary skill in the art that any changes and modifications can be made thereto without departing from the spirit or scope of the invention as set forth herein.

What is claimed:

1. In a method of determining the nonambiguous velocity of a radar target by use of a pulse-Doppler radar, including
   emitting a transmit signal comprising at least two pulse trains having different pulse repetition frequencies,
   evaluating the echo signals, which are associated with each pulse train and are reflected at a radar target, using a Doppler filter bank comprising a predetermined number of Doppler filters, with a predetermined velocity range corresponding to each Doppler filter, and
   determining a nonambiguous velocity of the target from the combination of the signals of the Doppler filters associated with each pulse repetition frequency; the improvement comprising:
   as a function of a predetermined velocity non ambiguous range ($V_{eb}$) and of a predetermined velocity increment ($V_{Inkr}$), subdividing the velocity nonambiguity range ($V_{eb}$) into an integral number of nonambiguous Doppler numbers ($DN_{n/m}$; n,m=1,2, . . . ) whose width corresponds to that of the velocity increment ($V_{Inkr}$);
   emitting the two pulse trains (bursts) having different pulse repetition frequencies ($PRF_1$, $PRF_2$, . . . ) which are used so as to be alternating in time, with the respective pulse repetition frequencies being selected to be at a fixed, predetermined, integral ratio (SV) relative to one another, and with each pulse repetition frequency ($PRF_1$, $PRF_2$, . . . ) comprising an integral multiple ($N_1$, $N_2$, . . . ) of the velocity increment ($V_{Inkr}$), with the velocity increments being numbered consecutively within each pulse repetition frequency ($PRF_1$, $PRF_2$, ...) and being identified as Doppler numbers ($DN_1$, $DN_2$, ...), and with the velocity nonambiguity range ($V_{eb}$) including integral multiples of the respective pulse repetition frequencies ($PRF_1$, $PRF_2$, ...);

for each echo signal and each pulse repetition frequency in ($PRF_1$, $PRF_2$, ...) the Doppler filter bank, determining at least one first filter number (FI_1) of that Doppler filter which comprises the maximum (largest) amplitude value ($A_k$);

determining a Doppler number ($DN_1$, $DN_2$, ...) which is associated with the number (FI_1) of the respective Doppler filter and the respective pulse repetition frequency using at least two tables, with each table being associated with a respective transmitter pulse repetition frequency;

for each combination of the determined Doppler numbers ($DN_1$, $DN_2$, ...), determining an associated nonambiguous Doppler number ($DN_{n/m}$; n.m=1,2, ...) within the velocity nonambiguity range ($V_{eb}$); and multiplying the nonambiguous Doppler number ($DN_{n/m}$; n.m=1,2, ...) and the velocity increment ($V_{Inkr}$) to determine the nonambiguous velocity of the radar target.

2. A method according to claim 1, wherein the determination of a Doppler number ($DN_1$, $DN_2$, ...) further includes:

additionally determining a second filter number (FI_2) of that Doppler filter which comprises the second largest amplitude value;

forming the quotient of the second largest and the maximum (largest) amplitude values; and determining the Doppler number ($DN_1$, $DN_2$, ...) in a table as a function of the filter numbers (FI_1, FI_2) as well as of the quotient.

3. A method according to claim 1, wherein for two respective pulse repetition frequencies ($PRF_1$, $PRF_2$, ...), the associated Doppler numbers ($DN_1$, $DN_2$, ...) are determined and the associated nonambiguous Doppler number ($DN_{n/m}$; n.m=1,2, ...) is determined from the combination of the respective associated Doppler number ($DN_1$, $DN_2$, ...), using the Chinese remainder set theorem.

4. A method according to claim 1 further comprising:

determining whether faulty Doppler numbers ($DN_1$, $DN_2$, ...) are present by:

first determining the Doppler numbers ($DN_1$, $DN_2$, ...) which are associated with two pulse repetition frequencies ($PRF_1$, $PRF_2$, ...) to which a respective staggering ratio (SV) is allocated;

forming a Doppler number difference (DDN) from the determined Doppler numbers ($DN_1$, $DN_2$, ...);

examining whether the Doppler number difference (DDN) represents a valid Doppler number difference (DDN) for the staggering ratio (SV); and, if the Doppler number difference does not represent a valid Doppler number difference, correcting at least one of the Doppler numbers ($DN_1$, $DN_2$, ...) such that, after the correction, the Doppler number difference (DDN) represents a valid Doppler number difference (DDN) for the staggering ratio (SV).

5. A method according to claims 1, further comprising:

forming a Doppler number difference (DDN) from the determined Doppler numbers ($DN_1$, $DN_2$, ...) for a determined Doppler number difference (DDN) which does not represent a permissible difference for the prevailing staggering ratio (SV), correcting at least one of the Doppler numbers ($DN_1$, $DN_2$, ...) to the extent that a corrected Doppler number difference thus created represents a permissible difference; and using the Doppler numbers ($DN_1$, $DN_2$, ...) corrected in this manner for the further evaluation.

6. A method according to claim 5, wherein for a staggering ratio (SV), with $SV=N_1:N_2$, $N_2-N_1>0$ and $N_2-N_1$ being odd, exactly $\pm(N_2-N_1-1)/2$ Doppler numbers can be corrected during the correction of at least one Doppler number $DN_1$, $DN_2$.

7. A method according to claim 1, wherein at least three different pulse repetition frequencies ($PRF_1$, $PRF_2$, $PRF_3$) are used, an associated Doppler number ($DN_1$, $DN_2$, $DN_3$) is determined for each pulse repetition frequency, from each two respective Doppler numbers ($DN_1$, $DN_2$, $DN_3$) a nonambiguous Doppler number ($DN_{1/2}$, $DN_{1/3}$ ...) is determined, and the nonambiguous velocity associated with at least two identical nonambiguous Doppler numbers, is considered to be correct.

8. A method according to claim 4, wherein by correction of the Doppler numbers, the velocity of a target is estimated with a precision GV according to the formula $$GV = \pm (VB_i / (2N_i))$$

wherein $VB_i$ represents the blind speed, $N_i$ the staggering number and i=1, 2, 3 the burst number.

9. A method according to claim 3, wherein by correction of the Doppler numbers, the velocity of a target is estimated with a precision GV according to the formula $$GV = \pm (VB_i / (2N_i)),$$

wherein $VB_i$ represents the blind speed, $N_i$ the staggering number and i=1, 2, 3 the burst number, and, while maintaining this precision (GV) by use of the Chinese remainder theorem, a convolution of the velocity into the nonambiguous velocity range $V_{eb(a:b)}$ is carried out according to the formula $$V_{eb(a/b)} = \pm \frac{N_b \cdot VB_a}{2 \cdot (N_b - N_a)}$$

wherein $N_a:N_b$ represents the staggering ratio SV and $VB_i$ (i=a, b) represents the blind speeds.

* * * * *